United States Patent [19]
Payne

[11] Patent Number: 5,558,471
[45] Date of Patent: Sep. 24, 1996

[54] DEVICE FOR INJECTING CHEMICALS INTO THE SOIL

[76] Inventor: Gary L. Payne, HC 02, Box 36, McGee, Mo. 63763

[21] Appl. No.: 409,344

[22] Filed: Mar. 23, 1995

[51] Int. Cl.$^6$ ................................ A01C 13/00
[52] U.S. Cl. .................. 405/269; 47/1.5; 111/123
[58] Field of Search ................... 405/263, 264, 405/265, 269; 47/1.5; 56/16.4 R, 16.8; 111/123

[56] References Cited

U.S. PATENT DOCUMENTS

| | | | |
|---|---|---|---|
| 1,643,846 | 9/1927 | Hale | 47/1.5 |
| 1,780,587 | 11/1930 | Gustafson . | |
| 2,668,490 | 2/1954 | Oehler . | |
| 3,610,184 | 10/1971 | Carroll et al. . | |
| 3,799,079 | 3/1974 | Dietrich . | |
| 4,073,152 | 2/1978 | Kishitani et al. | 405/265 X |
| 4,337,712 | 7/1982 | Michalko . | |
| 4,426,940 | 1/1984 | Brain et al. . | |
| 4,677,787 | 7/1987 | Said | 47/1.5 |
| 4,803,801 | 2/1989 | Nelson, Jr. | 47/1.5 |
| 4,932,477 | 6/1990 | Atwood . | |
| 4,993,498 | 2/1991 | Fresnel | 405/263 X |
| 5,101,745 | 4/1992 | Podevels et al. . | |

OTHER PUBLICATIONS

Hiaiker Ad, Soybean Digest, Feb. 1995, Hiniker Co., back of p. 59.

Primary Examiner—William P. Neuder
Attorney, Agent, or Firm—Sharon Payne

[57] ABSTRACT

This invention is a device for injecting chemicals into the soil, comprising two embodiments. In both embodiments a disc cuts the soil, making way for a brace with a knife that cuts away the soil further. A nozzle connected to a tube, which draws chemical from a reservoir, sprays the chemical directly into the soil. A belt, which encircles two drums, keeps the vegetation on the soil. In one embodiment the discs are on the drums. In the second embodiment the disc is separate from the drums.

29 Claims, 8 Drawing Sheets

DEVICE FOR INJECTING CHEMICALS INTO THE SOIL

BACKGROUND OF THE INVENTION

The present invention relates in general to a device for injecting chemicals into the soil and pertains, more particularly, to a device that spreads chemicals underground while holding vegetation, typically left on the surface of no-till fields, with a belt over an injected area.

With conventional devices it is difficult to apply chemicals at a given depth below the ground. The present invention allows the operator to accurately set the depth at which the chemical will be applied. Conventional devices also do not provide for a means to spray a chemical, such as a herbicide, directly on the root of the target plant. Chemicals sprayed on or just below the surface are washed away with conventional devices.

Accordingly, the present invention provides a way to set the depth at which a chemical is applied to the ground. In this manner chemicals such as herbicides can be incorporated into the soil accurately.

Another object of this invention is to provide a disc that cuts the vegetation in its path and cuts the soil with knives so that the roots of the target plant are exposed. Herbicide is sprayed directly on those roots, increasing the herbicide's effectiveness. Not as much herbicide or other chemical is washed away, because it is buried into the ground. It also takes less moisture to activate the herbicide.

Still another object of this invention is to provide a mechanism by which the vegetation is held over the cut area of no-till soil as the chemical is being applied. This invention provides a belt which travels over the area which was cut and keeps the vegetation on the surface.

A further object of this invention is to provide a machine that can spray chemicals on several rows at a time. Two embodiments of this invention involve several sets of discs, drums and belts with supports or braces in a zigzag pattern to avoid interference.

An additional object of this invention is to provide a way to make a seed bed in conventionally tilled soil. Moving the belt faster than the device is moving on conventionally tilled soil allows one to make a seed bed.

A further object is to provide a means so that it can be pulled with a conventional tractor or other like vehicle.

SUMMARY OF THE INVENTION

To accomplish the foregoing and other objects of the present invention there is provided a device with a disc to cut vegetation, a brace with a knife to cut the soil, and a nozzle with a hose connected the nozzle. A belt with cleats on the outside surface which encircles the drums rotates continuously and holds the vegetation on the surface of no-till soil while the device is pulled through it.

The drums in this invention can be turned by the friction of the belt hitting the ground or, preferably, with a hydraulic or power-take-off motor. When the machine slows down, a hydraulic motor keeps the drums moving. A nozzle sits near the knives and a hose connects the nozzle to a reservoir. The disc, knives and the brace cut the ground, and the nozzle delivers the chemical to the tunnel formed by the knife under the surface from the hose.

The first embodiment incorporates at least two discs, each disc attached to a front drum and a back drum. The belt encircles both drums and holds the vegetation on the soil as the device travels over it. A brace connects the knife and the nozzle to a supporting means, which can be the top portion of a piece of conventional farm equipment, such as a field cultivator. In another embodiment a disc rotates in front of two drums, and the belt encircles the drums. The front of the belt cannot go any further than the front of the knife. The flexible part of the belt must be over the knife. In both embodiments, the belt or belts must be moving when the device touches the ground.

In another embodiment of the knife, a plurality of blades form a "V", and the knife has a raised back portion to accommodate the nozzle.

DETAILED DESCRIPTION OF THE INVENTION

Figure 1:
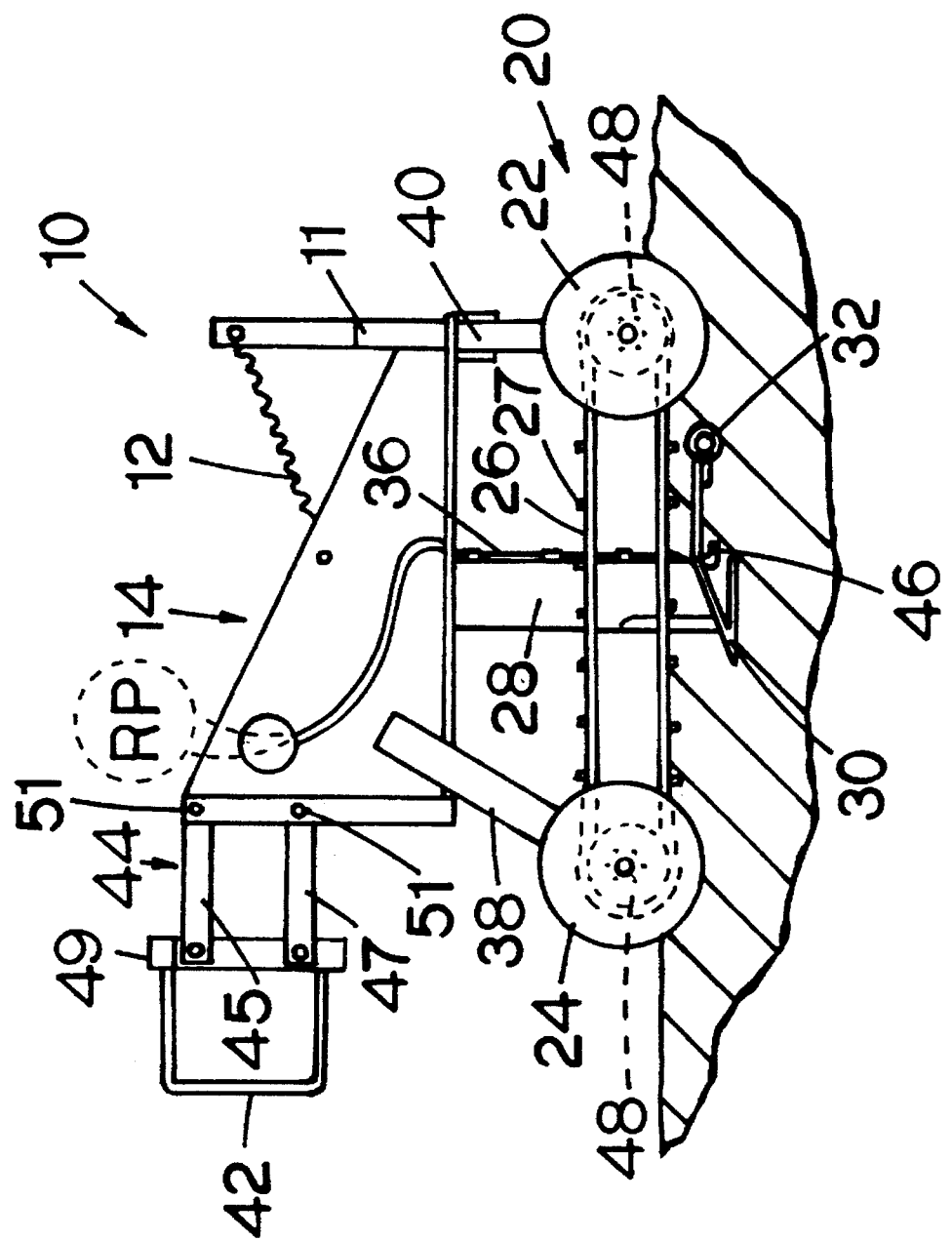
FIG. 1 illustrates the first embodiment of the invention.
Figure 2:
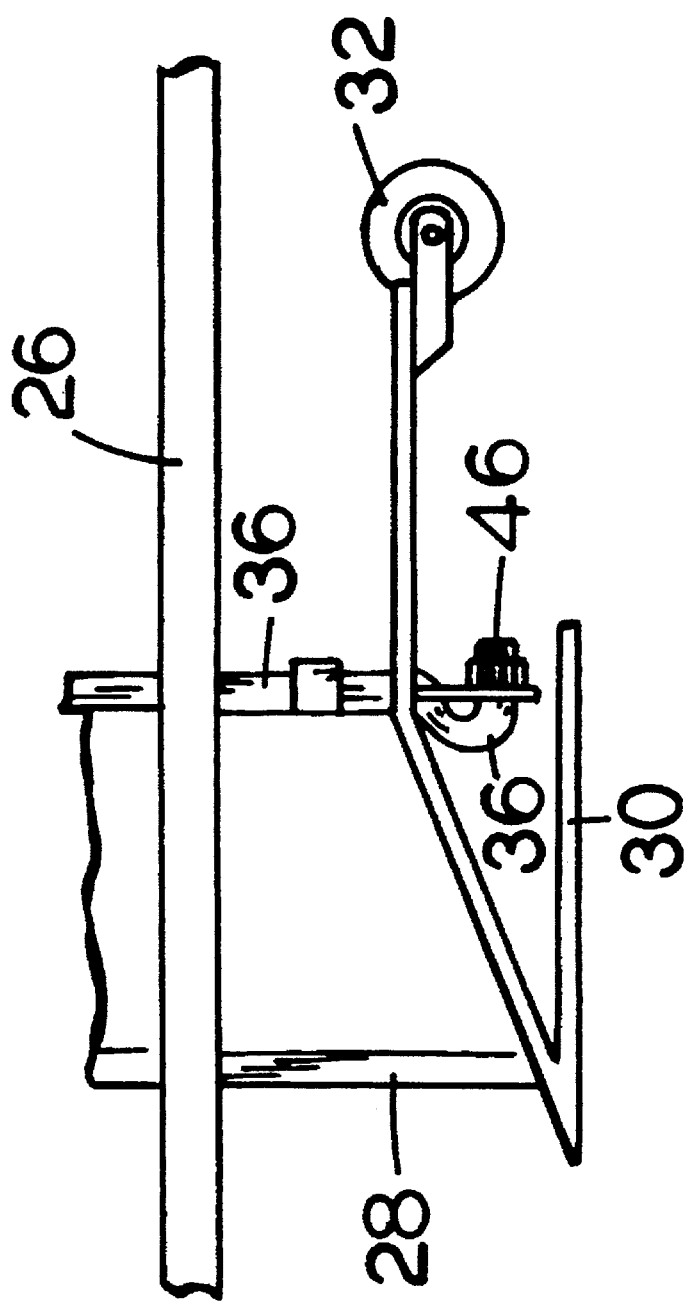
FIG. 2 is a closer view of the nozzle and knives as they sit under the belt in the first embodiment.
Figure 3:
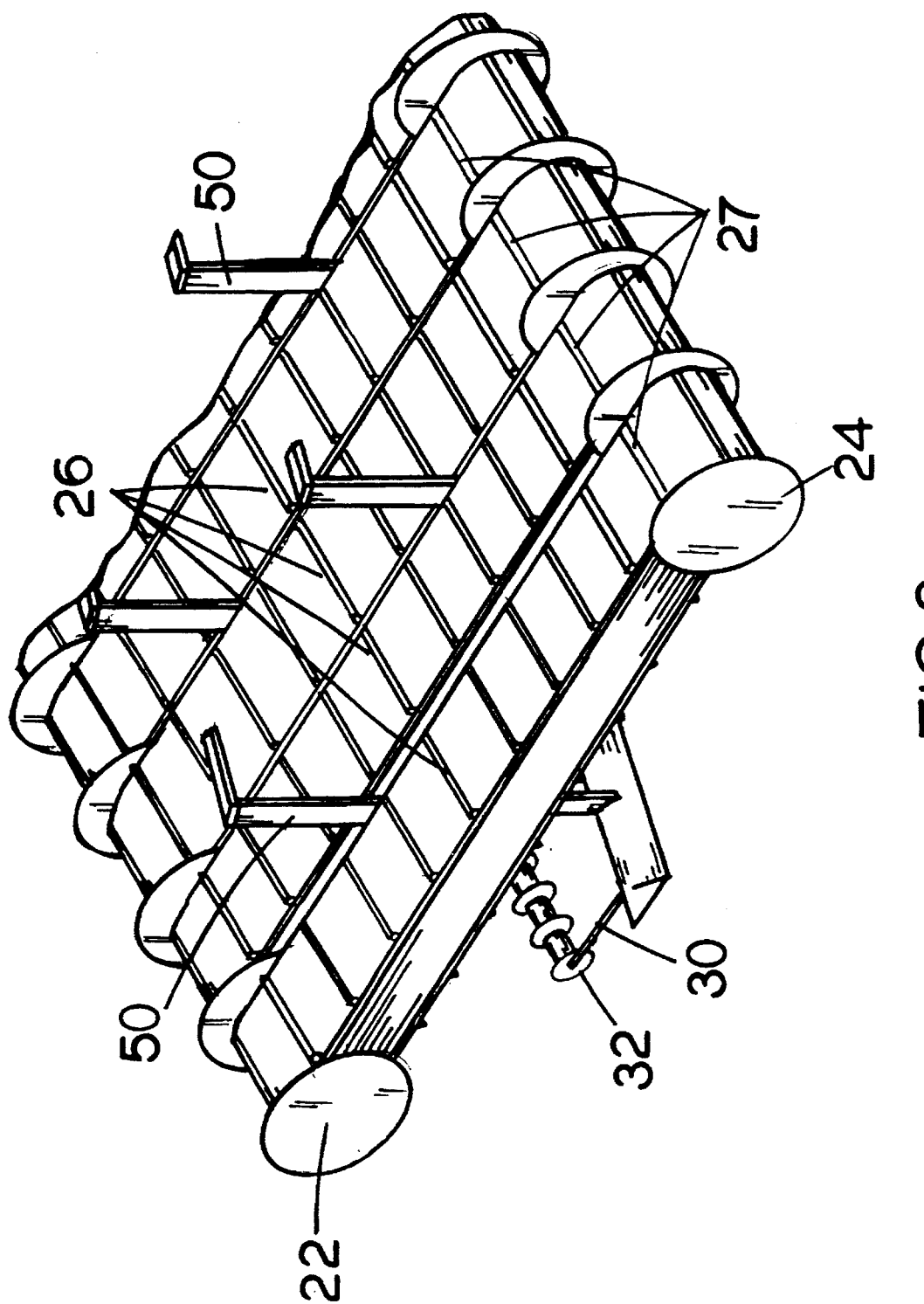
FIG. 3 is a variation of the first embodiment, using several sets of belts and discs on one machine.
Figure 4:
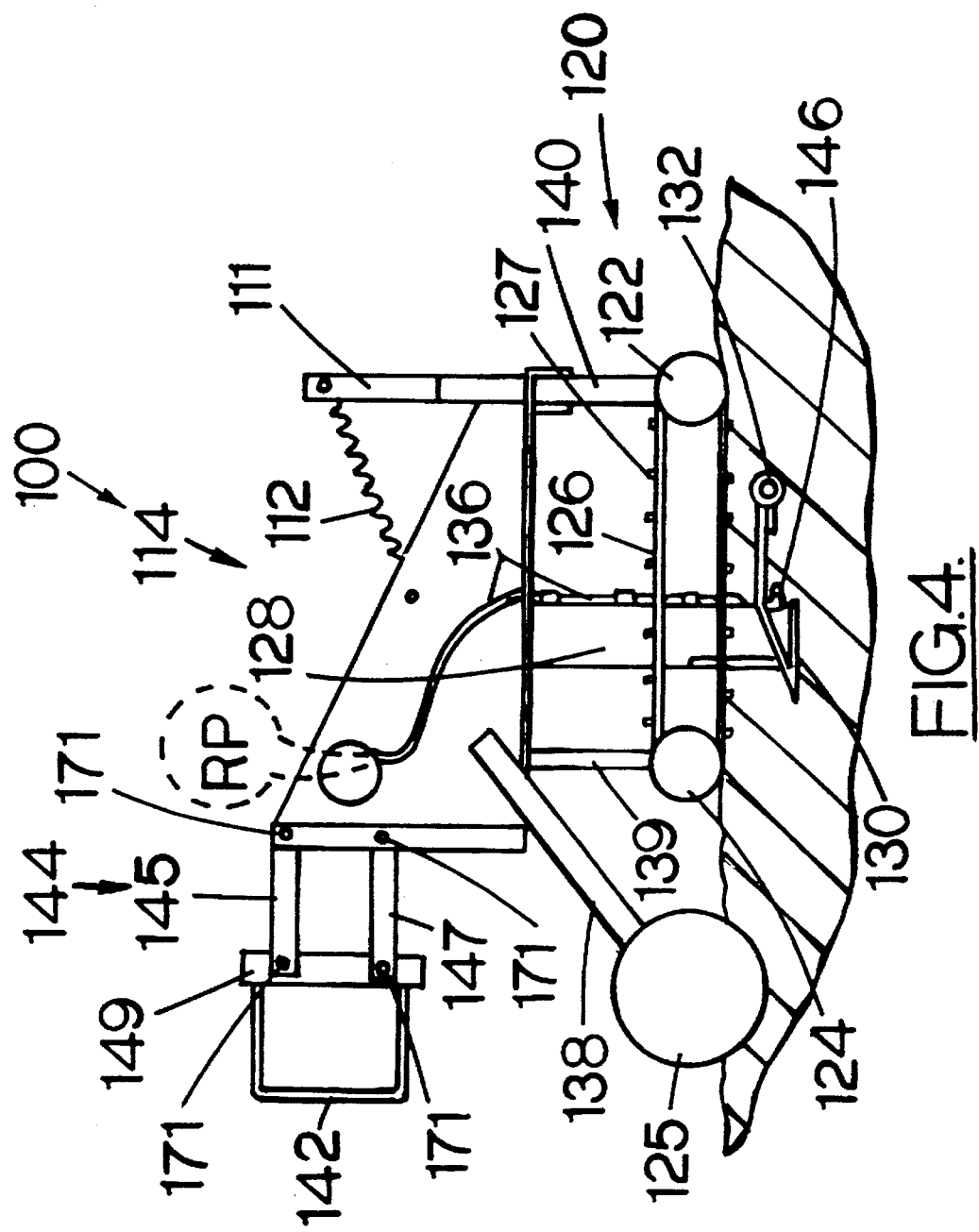
FIG. 4 illustrates the second embodiment of the invention.
Figure 5:
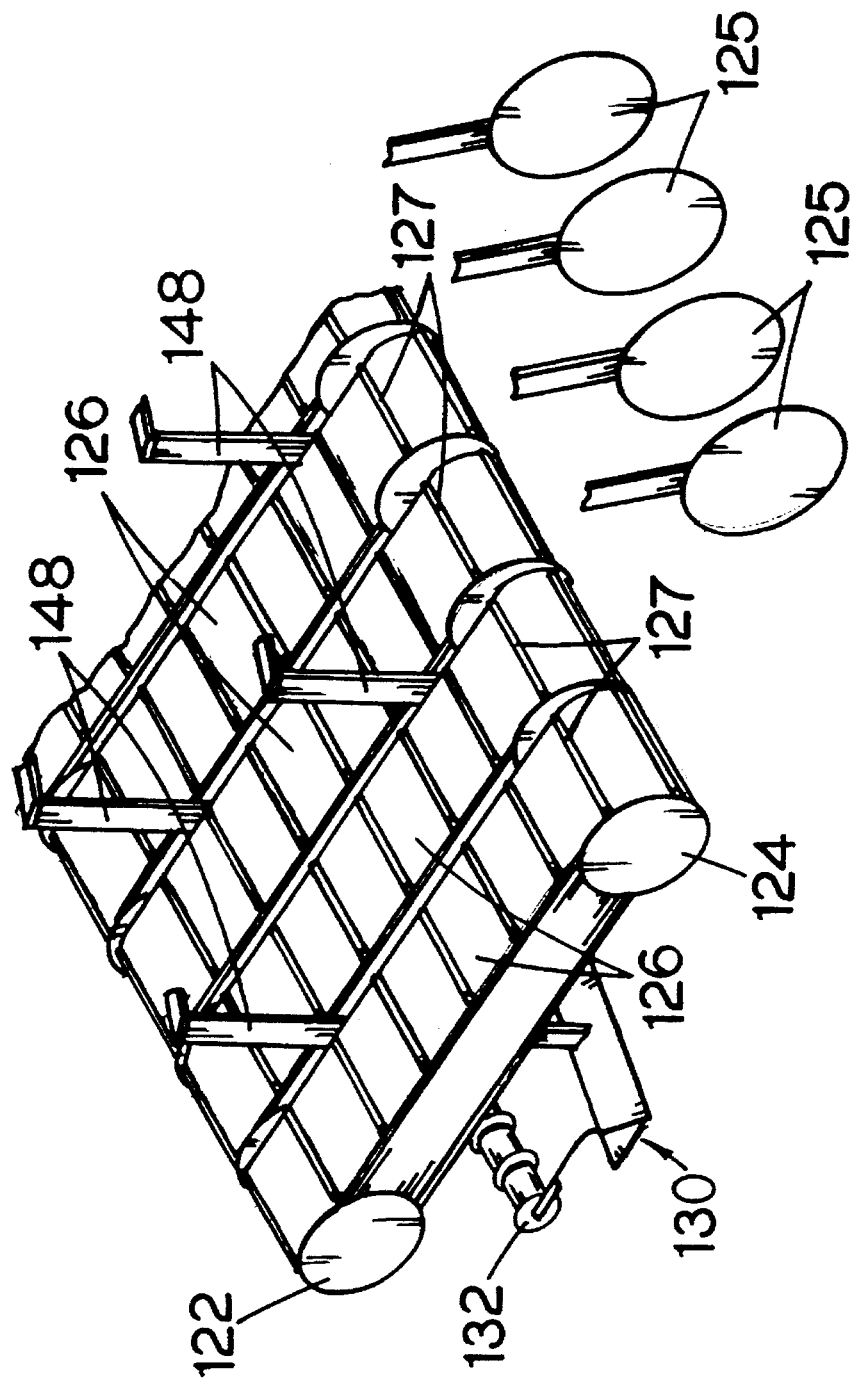
FIG. 5 illustrates a variation on the second embodiment of the invention wherein several sets of drums, discs and belts are used at the same time.
Figure 6:
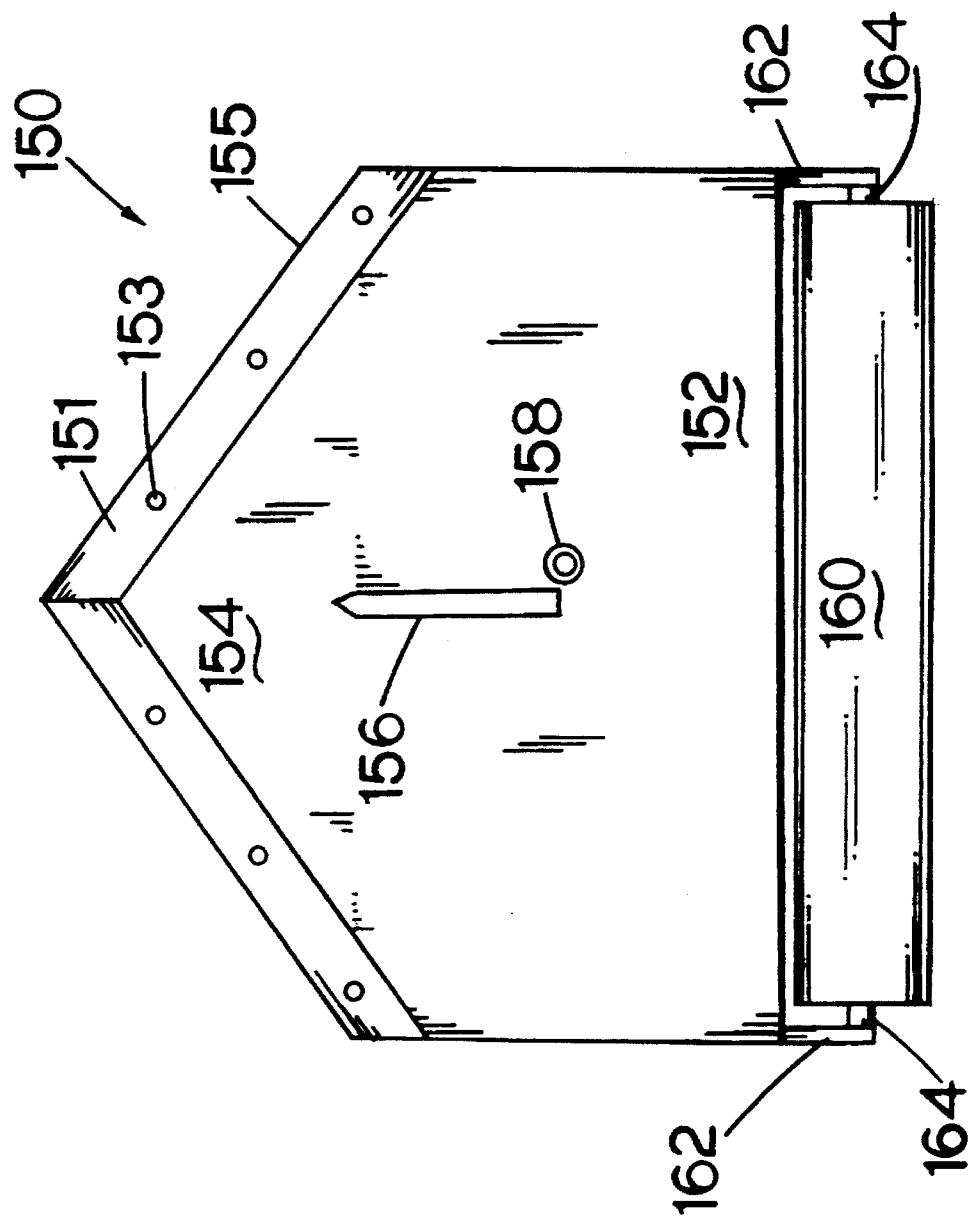
FIG. 6 illustrates an improved embodiment of the knife with a roller instead of a guage wheel.

The first embodiment of this invention 10 comprises a means to support the device 14, a spring 12, the working section 20, and the means to attach the device comprising a hitch 42 and a hinge 44. A tractor or any other vehicle suitable for pulling a farm implement over the soil can pull this device.

The working section of the first embodiment of this device comprises a belt 26 with cleats 27 a pair of drums 48, attached to discs 22 and 24. The belt 26 wraps around both drums. A brace 28 supports the knives 30. The knife 30 is further supported by a guage wheel 32. Chemical from a reservoir with a pump (shown as the schematic RP in dashed lines) is transported from the supporting means 14 to a nozzle 46 via a tube 36. The nozzle 46 can be any configuration to vary the spray pattern. For example, the nozzle can be a fan nozzle, or a plurality of nozzles can be used at the end of one hose. It is used to spray the chemical coming from the reservoir through the tube. The discs 22 and 24 cut the earth and the blades further clear a path below the ground surface for the chemical. The reservoir sits above the pump, and the chemical is pumped through the tube 36 to the nozzle 46. The nozzle 46 sprays the chemical directly into the soil within a tunnel cleared by the blade as it is pulled under the surface of the soil. Less chemical is wasted, because less of it washes off. The belt 26 keeps existing vegetation on the surface of the soil. The depth of the knife 30 relative to the surface of the soil, can be adjusted by adjusting a front disc attachment part 38 by any conventional means, such as a pin through one of a plurality of holes or with adjustment screws. The knife 30 can be 15 inches long.

This device can be attached to a vehicle with the hitch 42, which is attached to a hinge 44. The hinge 44 can be pivoted around the pivot attachments 51 to allow the device to adjust for the inevitable hills in the soil. The hinge comprises a top part 45 and a bottom part 47. The vertical connector 49 connects the hinge 44 to the hitch 42. The hinge is connected to the supporting means 14.

The discs 22 and 24 and drums 48 are connected to the supporting means by the front disc attachment part 38 and a back disc attachment part 40. The back disc attachment part 40 is connected to a back support 11 on the supporting means 14. The discs 22 and 24 can be powered by a hydraulic or power-take-off device. They can also be allowed to move along the ground as a vehicle pulls the device.

One variation on this embodiment comprises using several sets of working sections 20 on one machine. Vertical supports 50, are arranged in a zigzag configuration, enabling them to support several knives 30.

The second embodiment of this invention 100 comprises a support means 114, a hinge 144, a hitch 142, and a working section 120. The support means 114 has a reservoir with a pump (shown as the schematic RP in dashed lines) a spring 112 and an upright 111.

The working section 120 comprises a pair of drums 122 and 124 encircled by a belt 126 with cleats 127. A tube 136 connects the reservoir to a nozzle 146. A knife 130 is connected to a brace 128, which is connected to the supporting means 114. The drums 122 and 124 are connected to the supporting means by an attachment for the rear drum 140 and an attachment for the front drum 139. A disc 125 is separately attached to the supporting means 114 with a front attachment 138, which can be adjusted by any conventional means to adjust the height of the knife 130. A wheel 132 operates as a guage wheel and supports the knife 130. The front of the belt 126 cannot go any further back than the front of the knife 130. The flexible part of the belt 126 must be over the knife 130.

A hinge 144 is connected to the supporting means 114 with a top portion 145 and a bottom portion 147. The hinge 144 pivots around pivot attachments 171 to allow the device to adjust for the inevitable hills in the earth. A hitch 142 allows one to connect this device to a vehicle.

The separately attached disc 125 cuts the earth, enabling the knife 130 to do a better job of clearing a section in which the nozzle sprays the chemical. Spraying the chemical directly into the earth allows it to work more effectively, because less is washed away. The drums 122 and 124 enable the belt 126 to keep the surface vegetation on the earth as the chemical is sprayed.

A variation of the second embodiment 100 comprises using multiple working sections 120 in one machine. Vertical supports 148, are arranged in a zigzag manner so that several knives 130 could be used.

An improved embodiment of the knife 150 comprises a front portion 154 and a rear portion 152. The front portion has the blades 151 in a "V" pattern to more easily enable it to cut the earth. A brace 156 connects this knife to a support structure 14 or 114 and a hole 158 enables the tube 36 or 136 to connect the reservoir to the nozzle 46 or 146. A roller 160 supports the knife and a connector 162 connects the roller to an axle 164 to the back portion 152. The front portion 154 is bent downward. The blades 151 can be formed integrally with the front portion 154 and the back portion 152. However, a preferred configuration includes separate blades 151 that can be replaced in a separate cover comprising a front portion 154 and a back portion 152, which leaves the cutting portion of the blades 155 exposed to cut the earth in front of the blades 151. The blades 151 can be bolted with any conventional bolt 153 on the top of the front portion 154. However, any other conventional means of attaching the blades 151 could be used.

Figure 7:
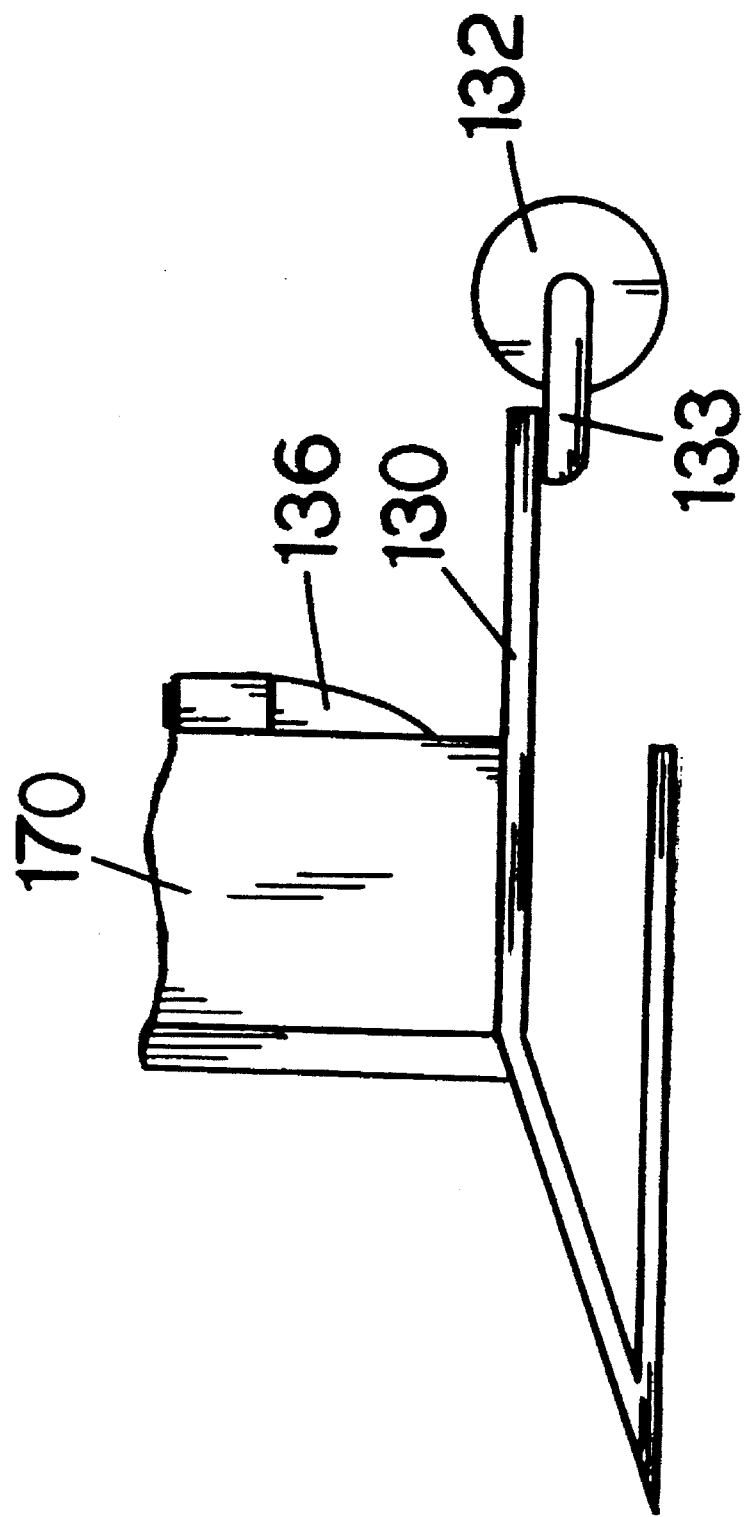
FIG. 7 illustrates another possible position of the brace on the first embodiment of the knife.
Figure 8:
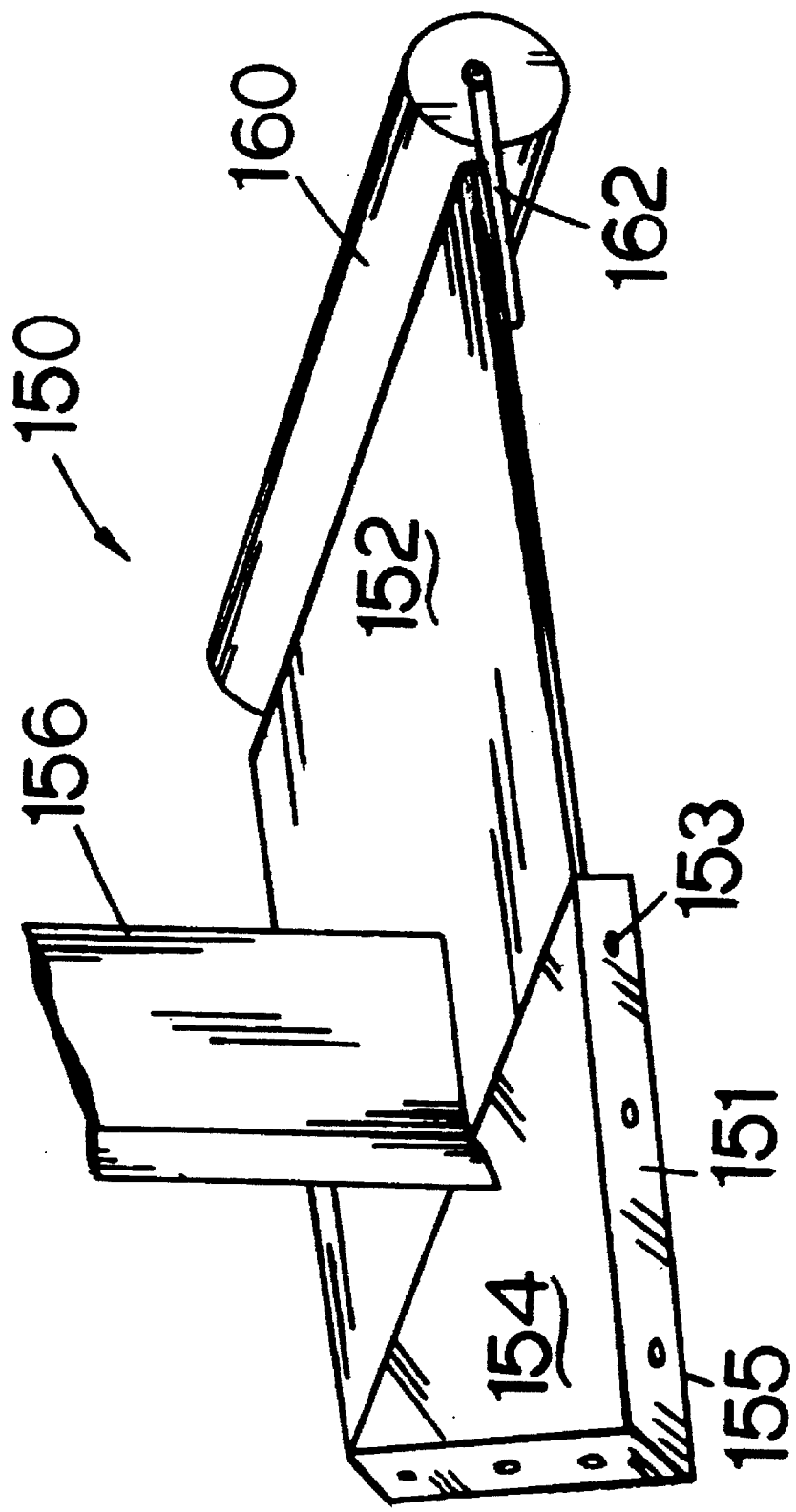
FIG. 8 is the side view of the improved embodiment of the knife showing how the front portion is bent downward.

Another embodiment of a brace 170 is shown in FIG. 7. The brace 170 is only on one side of knife 130. This decreases the resistance encountered by the brace 170.

To use this invention on no-till soil, the belts 26 or 126 must be turning before the device is placed onto the ground. Any conventional means can be used to raise the device and turn the belts, such as a power-take-off device or a hydraulic motor. The discs 22, 24, 122 and 124 and knives 30, 130 and 150 on both embodiments will cut the soil while the belts 26 or 126 hold the vegetation on the earth. The pressurized chemical Will be pumped out of the reservoir through the tubes 36 or 136 into the nozzle 46 or 146.

To make a seed bed on conventionally tilled ground, one must turn the belts 26 or 126 before the device is set upon the ground. The device must be moving at a slower speed than the belts 26 or 126.

Having described the invention in detail, those skilled in the art will appreciate that modification may be made of the invention without departing from its spirit. Therefore, it is not intended that the scope of the invention be limited to the specific embodiments illustrated and described. Rather, it is intended that the scope of this invention be determined by the appended claims and their equivalents.

I claim:

1. A device for injecting chemicals into the soil comprising:
    at least one pair of drums, a front drum and a back drum, each drum having a side surface;
    at least one belt encircling each pair of drums;
    at least one disc mounted on at least one side surface of at least one drum;
    means to support the device connected to the drums;
    at least one brace connected to the means to support the device;
    a knife extending from each brace;
    at least one tube having a first end and a second end; and
    at least one nozzle connected to the first end of each tube.

2. The device described in claim 1 further comprising: means to turn at least one drum connected to at least one drum.

3. The device described in claim 1 further comprising: means to connect each front drum extending from the front drum to the means to support the device; and
    means to connect each back drum extending from the back drum to the means to support the device.

4. The device described in claim 3 wherein the means to connect each front drum is adjustable.

5. The device described in claim 1 wherein at least one belt has cleats which enable the belt to grip the surface of the ground.

6. The device described in claim 1 further comprising:
    means to hold a reservoir connected to the second end of the tube.

7. The device described in claim 1 further comprising a means to move the device connected to the device.

8. The device described in claim 2 wherein the means to turn at least one drum comprises a hydraulic motor.

9. The device described in claim 2 wherein the means to turn at least one drum comprises a power-take-off motor.

10. The device described in claim 1 wherein a plurality of belts encircle a plurality of pairs of drums;

at least one support extends on one side of at least one belt;

and a knife is connected to at least one support.

11. The device described in claim 1 further comprising at least one guage wheel attached to at least one knife, supporting the knife.

12. A device described in claim 1 further comprising a means to attach the device to the means to support the device comprising:

a hinge connected to the means to support the device; and a hitch connected to the hinge.

13. The device described in claim 1 wherein each knife comprises at least one blade, each blade having a cutting portion; and a top portion of the knife, the blades attached to the top portion of the knife.

14. A device to spray chemicals into the soil comprising:

at least one pair of drums, each pair comprising a front drum and a back drum;

at least one belt, each belt encircling a pair of drums;

at least one disc, each disc positioned in front of a front drum;

at least one nozzle;

at least one tube, connected to at least one nozzle, each tube having a first end and a second end; and at least one brace, each brace positioned on one side of a belt;

at least one knife, each knife connected to a brace.

15. The device-described in claim 14 wherein at least one belt has cleats which enable the belt to grip the surface of the ground.

16. The device described in claim 14 wherein each knife comprises at least one blade; and a top portion of the knife, each blade attached to the top portion.

17. The device described in claim 14 further comprising a means to support the device.

18. The device described in claim 17 wherein the means to support the device has extensions to at least one disc, each extension being adjustable.

19. The device described in claim 14 wherein the braces are replaced by a plurality of supports.

20. The device described in claim 16 further comprising means to move the device attached to the device.

21. The device described in claim 14 further comprising a means to attach the device comprising:

a hinge connected to the means to support the device; and a hitch connected to the hinge.

22. The device described in claim 14 further comprising a means to turn at least one drum connected to at least one drum.

23. The device described in claim 22 wherein the means to turn at least one drum is a hydraulic motor.

24. The device described in claim 22 wherein the means to turn at least one drum is a power-take-off device.

25. The device described in claim 14 further comprising a means to hold a reservoir connected to the second end of the tube.

26. A method of injecting chemicals into no-till soil comprising:

providing no-till soil;

providing at least one pair of drums, a front drum and a back drum, each drum having a side surface;

encircling each pair of drums with at least one belt;

mounting at least one disc on at least one side surface of at least one drum supporting the device connected to the drums with means to support the device;

connecting at the brace to the means to support the device;

extending a knife from each brace;

providing at least one tube having a first end and a second end;

extending a knife from each brace;

connecting at least one nozzle to the first end of each tube;

keeping all available belts off of the soil;

providing a reservoir of chemical connected to a second end of each tube;

moving all available belts;

putting the belts on the soil;

moving the device through the soil; and pumping the chemical through the nozzle into the soil.

27. A method off making a seed bed comprising:

providing conventionally tilled soil;

providing at least one pair of drums, a front drum and a back drum, each drum having a side surface;

encircling each pair of drums with at least one belt;

mounting at least one disc on at least one side surface of at least one drum;

supporting the device connected to the drums with means to support the device;

connecting at least one brace to the means to support the device;

extending a knife from each brace;

keeping all available belts above the soil;

moving the belt at a given speed;

placing the device on the soil; and moving the device at a lesser speed than the belt.

28. A method of making a seed bed comprising:

providing conventionally tilled soil;

providing at least one pair of drums, each pair comprising a front drum and a back drum;

providing at least one belt, each belt encircling a pair of drums;

providing at least one disc, each disc positioned in front of a drum;

connecting at least one brace, each brace positioned on one side of said belt;

providing at least one knife, each knife connected to a brace;

keeping all available belts above the soil;

moving all available belts at a given speed;

placing the device on the soil; and moving the device at a lesser speed than the belt.

29. A method of injecting chemicals into no-till soil comprising:

providing no-till soil;

providing at least one pair of drums, each pair comprising a front drum and a back drum;

providing at least one belt, each belt encircling a pair of drums;

providing at least one disc, each disc positioned in front of a front drum;

providing at least one nozzle;

providing at least one tube connected to at least one nozzle, each tube having a first end and a second end with the first end connected to the nozzle;

connecting at least one brace, each brace positioned on one side of said belt;

providing at least one knife, each knife connected to a brace;

providing a reservoir of chemical connected to the second end of the tube;

keeping the device out of the soil;

moving all available belts on the device;

putting the device into the soil;

moving the device through the soil; and pumping the chemical through said tube to the nozzle into the soil.

* * * * *